US011394283B2

(12) United States Patent
Walisko et al.

(10) Patent No.: US 11,394,283 B2
(45) Date of Patent: Jul. 19, 2022

(54) COMBINED UHV INSULATION SYSTEM

(71) Applicant: Hanon Systems, Daejeon (KR)

(72) Inventors: David Walisko, Hürth (DE); Frank Mau, Aachen (DE); Marco Hombitzer, Aachen (DE)

(73) Assignee: HANON SYSTEMS, Daejeon (KR)

( * ) Notice: Subject to any disclaimer, the term of this patent is extended or adjusted under 35 U.S.C. 154(b) by 229 days.

(21) Appl. No.: 16/867,745

(22) Filed: May 6, 2020

(65) Prior Publication Data

US 2020/0366173 A1    Nov. 19, 2020

(30) Foreign Application Priority Data

May 14, 2019    (DE) ..................... 10 2019 112 549.9

(51) Int. Cl.
| | |
|---|---|
| *H02K 15/10* | (2006.01) |
| *H02K 3/38* | (2006.01) |
| *H02K 3/32* | (2006.01) |
| *H02K 3/40* | (2006.01) |
| *H02K 15/12* | (2006.01) |

(52) U.S. Cl.
CPC ............. *H02K 15/105* (2013.01); *H02K 3/38* (2013.01); *H02K 15/12* (2013.01); *H02K 3/40* (2013.01)

(58) Field of Classification Search
CPC ........ H02K 15/105; H02K 3/38; H02K 15/12; H02K 3/40; H02K 3/24
See application file for complete search history.

(56) References Cited

U.S. PATENT DOCUMENTS

| | | | | |
|---|---|---|---|---|
| 6,288,460 | B1 * | 9/2001 | Fakult | H02K 5/203 |
| | | | | 310/58 |
| 7,514,826 | B2 * | 4/2009 | Wakita | H02K 3/24 |
| | | | | 310/201 |
| 8,310,126 | B1 * | 11/2012 | Hopkins | H02K 1/278 |
| | | | | 310/216.057 |
| 8,487,500 | B2 * | 7/2013 | Cullen | H02K 3/24 |
| | | | | 310/216.081 |
| 9,300,179 | B2 * | 3/2016 | Sawada | H02K 3/30 |
| 10,361,597 | B2 * | 7/2019 | Juris | H02K 3/522 |
| 10,886,819 | B2 * | 1/2021 | Mayor | H02K 9/00 |

(Continued)

FOREIGN PATENT DOCUMENTS

| | | |
|---|---|---|
| DE | 102012217711 A1 | 4/2014 |
| DE | 102012218830 A1 | 5/2014 |

(Continued)

*Primary Examiner* — Burton S Mullins
(74) *Attorney, Agent, or Firm* — Shumaker, Loop & Kendrick, LLP; James D. Miller

(57) ABSTRACT

A stator unit of an electric motor for driving a hermetic compressor including a stator core and a coil separator cage, which is inserted into the stator core and includes a substantially annular disc-shaped base part and elongated separating webs distributed over the circumference of the base part, with their longitudinal axes extending in the axial direction relative to the stator core, wherein the annular disc-shaped base part is fastened to a first end face of the stator core, and a separating web engages in each stator slot, such that one of the separating webs is arranged between two adjacent coils, wherein each gap between the coil separator cage and the coil windings is filled with an insulating filler.

8 Claims, 9 Drawing Sheets

(56) References Cited

U.S. PATENT DOCUMENTS

| | | | |
|---|---|---|---|
| 2003/0098630 A1 | 5/2003 | Owada et al. | |
| 2006/0043801 A1* | 3/2006 | Adra | H02K 3/24 310/54 |
| 2008/0197724 A1 | 8/2008 | Cullen et al. | |
| 2010/0176669 A1* | 7/2010 | Houle | H02K 5/203 310/54 |
| 2011/0221287 A1 | 9/2011 | Lucchi | |
| 2014/0015358 A1* | 1/2014 | Wan | H02K 15/02 310/198 |
| 2014/0091651 A1* | 4/2014 | Dorfstatter | H02K 9/00 310/58 |
| 2017/0063200 A1 | 3/2017 | Tremelling et al. | |
| 2017/0141653 A1 | 5/2017 | Okazaki et al. | |
| 2018/0115222 A1* | 4/2018 | Lassila | H02K 1/146 |

FOREIGN PATENT DOCUMENTS

| | | | | |
|---|---|---|---|---|
| DE | 102014221204 A1 | | 4/2016 | |
| JP | 5409234 B2 | | 2/2014 | |
| WO | WO 00/01053 | * | 1/2000 | H02K 3/24 |

\* cited by examiner

COMBINED UHV INSULATION SYSTEM

CROSS-REFERENCE TO RELATED PATENT APPLICATION

The present disclosure claims the benefit of German Patent Application No. DE 102019112549.9 filed May 14, 2019, the entire contents of which are hereby incorporated herein by reference.

FIELD

The invention relates to a stator unit of an electric motor for driving a hermetic compressor, in particular for motor vehicle air conditioning systems. Furthermore, the invention relates to a method for assembling a stator insulation system for a corresponding stator unit.

BACKGROUND

Due to a high voltage range of up to 1,000 V, the requirements regarding insulation coordination in electric compressors are extremely high. Such requirements for insulation coordination relate in particular to the so-called air gap as the shortest distance in air between two conductive parts, as well as the so-called creepage distance as the shortest distance along the surface of an insulator between these two conductive parts. International standards, e.g., from the independent organization Underwriters Laboratories (UL), which examines and certifies products in terms of their safety, and the International Electrotechnical Commission (IEC), require for a voltage range of up to, e.g., 1,000 V, that the creepage distance be 14 mm (IEC), and the air gap 10 mm (UL). Similar specifications are contained in national standards, e.g., those from the German Institute for Standardization (DIN).

For previously known EHV electric motors (~400 V), the shortest air gap between two coils is about 4 mm and the shortest creepage distances about 5 mm. For the automotive industry, the insulation system of hermetically sealed electric motors, which are suitable for air-conditioning systems, is a major challenge given the maximum voltage (UHV) of up to, e.g., 1,000 V, especially in applications with voltage ranges exceeding this.

The object of the invention is to provide a stator unit, which enables full compliance with existing insulation coordination requirements and the smallest possible dimensions at various voltage levels. Moreover, sufficient cooling of the stator should be ensured.

SUMMARY

This object is achieved by a stator unit, as well as by a method for assembling a stator insulation system, as described.

A stator unit of an electric motor for driving a hermetic compressor according to the invention comprises:
 a stator core with a substantially hollow-cylindrical stator yoke, which on its inside has coil webs evenly distributed over its circumference and directed radially inward relative to its cross-section, wherein stator slots are formed between adjacent coil webs in the circumferential direction, and lead wires are wound around the coil webs in order to form coils, and
 a coil separator cage, which is inserted into the stator core and comprises a substantially annular disc-shaped base part and elongated separating webs distributed over the circumference of the base part, with their longitudinal axes extending in the axial direction relative to the stator core, and whose cross-sections correspond to the shape of a recess in the base part and which, together with the corresponding recesses, form axial channels extending over the whole length of the coil separator cage, wherein the annular disc-shaped base part is fastened to a first end face of the stator core, and a separating web engages in each stator slot, such that one of the separating webs is arranged between two adjacent coils, wherein each gap between the coil separator cage and the coil windings is filled with an insulating filler.

In contrast, the axial channels remain free and provide cooling, which allows for reducing the motor temperature By using the coil separator cage in conjunction with a suitable filler, functional insulation of the live parts is ensured. Such a stator unit allows for complete hermetic sealing of the windings against the refrigerant and between the windings of the different phases of the stator unit. Particularly advantageous is the option of a closed unit of the insulating filler with the other components, which in an optimal situation results in hermetic sealing of the potential leakage current area between the lead wire and the other components. In this case, there would be no defects or other ways of defeating the newly created insulating unit consisting of the coil separator cage and a filler, or for refrigerant to seep in and possibly creating paths.

The coil separator cage may advantageously be made of one or more electrically non-conductive sprayable materials. For example, the coil separator cage may be made of a plastic material. The insulating filler is preferably an adhesive or other suitable, preferably epoxy resin-based binder. The separating webs are preferably longer in the axial direction than the coil webs and the coils wound around them.

One of the greatest difficulties that had to be overcome with such a solution using additional parts was that by simply pressing two different parts against one another, neither a potential leakage current path was eliminated, nor effectively blocked. There would always be a gap between the adjacent parts. In order to eliminate potential leakage-current paths, some type of adhesive bond has to be created. This would mean that a separating element would need to be glued to the adjacent parts in order to eliminate the creepage distances. One way would be to glue on intermediate parts between adjacent electrical current-conductive parts to extend the creepage distances for the leakage current, thereby meeting the IEC/UL/DIN requirements Completely filling critical areas with an insulating filler would be another way to avoid the problem of insufficient creepage distances. On the other hand, the use of the coil separator cage according to the invention makes it possible to increase the air gap between two coils in order to meet the IEC/UL/DIN requirements in terms of the air gap. The coil separator cage according to the invention provides a part, which is used together with the insulating filler in order to produce adhesive connections, whereby the creepage distances additionally can be increased in order to meet the IEC/UL/DIN requirements in this respect.

The coil separator cage is designed as a separating insert within the filler and between the windings, which insulates the different phases of the stator unit from one another. The whole area between the surfaces of the coil separator cage and the windings is covered by the filler and in this area produces a functioning insulation system, which meets the requirements for the use of extra high voltage.

According to a development of the present invention, the stator unit also has an inner closing ring, which is attached to the coil separator cage in proximity to a second end face opposite the first end face, such that the end areas of the separating webs opposite the annular disc-shaped base part contact with their inward-facing sides the outer wall of the inner closing ring distributed over its circumference. Thus, each gap between the coil separator cage, the coil windings and the inner closing ring is filled with the insulating filler. The closing ring is used, among other things, to support the axially inserted separators from the inside. The closing ring affords the coil separator cage more stability and connects key parts with one another.

With their respective sides facing outward, the separating webs preferably abut against the inner wall of the stator yoke or a basic insulation of said inner wall.

The coil separator cage has two different preferred shapes. According to an advantageous embodiment of the invention, the cross sections of the separating webs each have a rectangular U-shape. If a closing ring is present, the exposed side of the U-shape in proximity to the closing ring is covered by its outer wall. A constriction is preferably formed on the exposed side of the U-shape.

According to an alternative embodiment, the cross sections of the separating webs each have a V-shape, whereby if a closing ring is present, the exposed side of the V-shape in proximity to the closing ring is covered by its outer wall. An embodiment, wherein the V-limbs are convex, i.e., curved outward, is particularly preferred.

A significant advantage, besides increasing the resistance of the insulation, is the reduction of the required sealing components. This also makes for easier assembly. Compared to sealing by way of full potting, the thermal behavior is also better.

A further aspect of the invention therefore relates to a method of assembling a stator insulation system for the said stator unit, wherein:

$a_1$) a stator core with a substantially hollow-cylindrical stator yoke, which has coil webs arranged on its inner side uniformly distributed over its circumference and directed radially inward relative to its cross-section, is inserted into a stator core, whereby stator slots are formed between adjacent coil webs in the circumferential direction and lead wires are wound around the coil webs in order to form coils, a coil separator cage with a substantially annular disc-shaped base part and elongate coil separator cages arranged distributed over the circumference of the base part is inserted in the axial direction with its longitudinal axes running in the axial direction relative to the stator core, whose cross-section corresponds to the shape of a recess in the base part, and which, together with the corresponding recesses, form axial channels extending over the whole length of the coil separator cage, such that between two adjacent coils, one of the separating webs is inserted in the axial direction, and the annular disc-shaped base part is fastened to a first end face of the stator core, and b) each gap between the coil separator cage and coils is filled with an insulating filler, whereas the axial channels remain free for cooling.

During assembly, the first step $a_1$) consists in axially inserting the coil isolator cage into the stator core. According to an advantageous embodiment of the method, in a step $a_2$) following step $a_1$) and preceding step b), the inner closing ring described above as being advantageous is attached to the coil separator cage from the side opposite the first end face, such that the end areas of the separating webs opposite the annular disc-shaped base part abut with their inward-facing sides distributed over the circumference of the inner closing ring against the outer wall of the inner closing ring, such that the separating webs are supported from the inside by said inner closing ring The inner closing ring may be attached to the coil separator cage. The closing ring affords the coil separator cage more stability and connects key parts. In process step b), each gap between the coil separator cage, the coil windings and the inner closing ring is subsequently filled with the insulating filler. The insulating filler is preferably introduced in the form of a potting compound or similar material. The use of the above-mentioned components and the additional use of a suitable potting material ensures functional insulation of the electrically conducting parts.

The stator unit according to the invention allows for full compliance with existing specifications and general requirements for electric motors in electric air conditioning compressors for vehicles at voltage levels up to 1,000 V and, if needed, even higher.

Further details, features and advantages of the embodiments of the invention are explained in the following description of the exemplary embodiments in reference to the accompanying drawings.

DETAILED DESCRIPTION OF THE INVENTION

Figure 1:
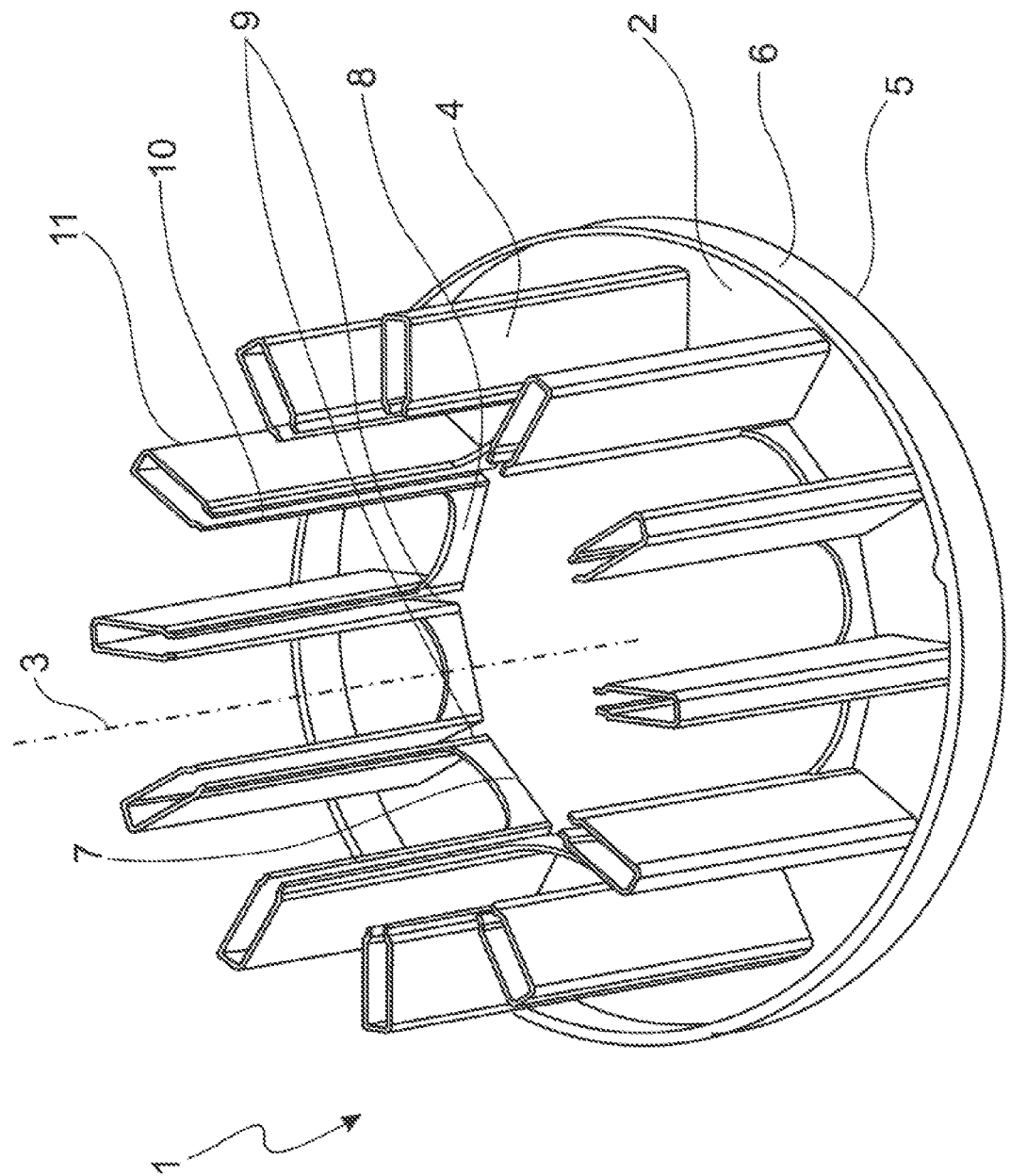
FIG. 1: a coil separator cage for a stator of an electric motor.

FIG. 1 shows an embodiment of a coil separator cage 1 for a stator unit of an electric motor according to the present invention. Such a coil separator cage comprises a substantially annular disc-shaped base part 2 and elongated elements connected thereto, distributed over the circumference of the base part 2 and aligned with their longitudinal axes parallel to the ring axis 3, in "lattice fence-like" fashion, hereinafter referred to as separators 4. The annular disc-shaped base part 2 has at its outer edge 5 a continuous circumferential outer frame 6, which is perpendicular, i.e., parallel to the ring axis 3, and at its inner edge 7, an interrupted circumferential, perpendicular inner frame 8. The inner edge 7 has recesses 9 distributed over its circumference, which, starting from the inner edge 7, extend substantially U- or V-shaped into the interior of the annular disc-shaped base part 2. Starting from these substantially U- or V-shaped recesses 9, the separating webs 4 extend in an axial direction relative to the ring axis 3. Thus, the cross section of each separating web 4 matches the shape of the recess 9 of the annular disc-shaped base part 2 at the starting point of the respective separating web 4. Each separating web 4, together with the corresponding recess 9, thus forms an elongated channel, whose longitudinal axis runs parallel to the ring axis 3, i.e., in the axial direction, and at the same time has an exposed longitudinal area 10, which is facing the interior of the coil separator cage 1, while a closed longitudinal area 11 of the separating web 4 opposite thereof is facing outward.

Figure 2:
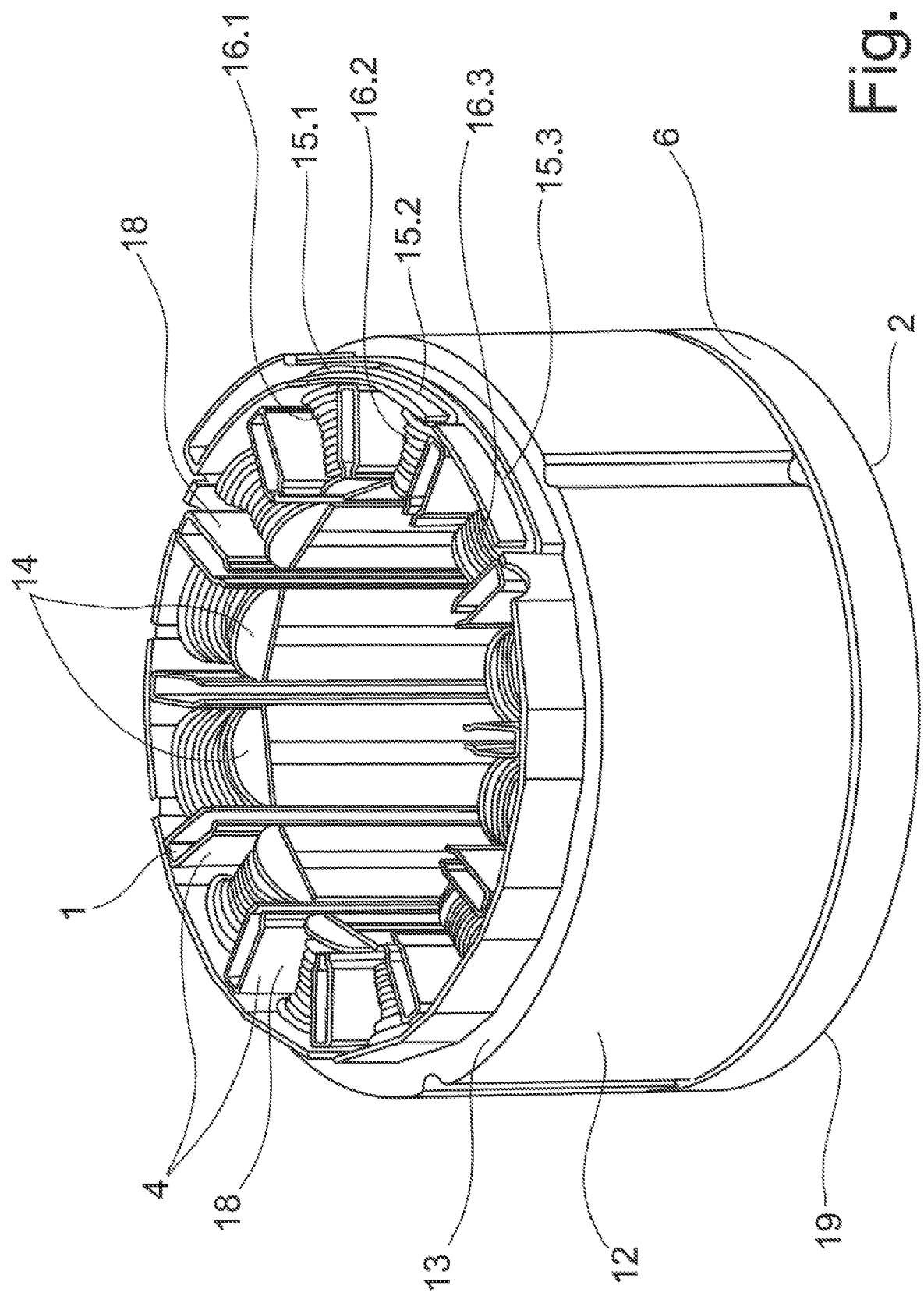
FIG. 2: a stator core with coils and a coil separator cage inserted into a first end face of the stator.

FIG. 2 shows a stator core 12 with a substantially hollow cylindrical stator yoke 13, which gives the stator core 12 a substantially cylindrical shape toward the outside. The stator core 12 is generally designed in the form of a stator lamination stack. The term "hollow cylindrical" refers to the circular cross-sectional shape of the hollow cylinder, as well as to elongated hollow bodies, whose outer wall is polygonal in cross section. On the inside of the substantially hollow cylindrical Stator yoke 13 of the stator core 12, the latter has coil webs 14, which are evenly distributed over its circumference and directed radially inward relative to its cross-section, and are elongated in the axial direction relative to the cylinder axis of the stator core 12. A lead wire 15.1; 15.2; 15.3 is wound around each coil web 14 to form a coil 16.1; 16.2; 16.3. The circumferentially adjacent coils 16.1, 16.2; 16.2, 16.3 are each wound by lead wires 15.1, 15.2; 15.2, 15.3 of different phases. The windings of the coils 16.1; 16.2; 16.3 are insulated from the stator core 12 by means of basic insulation of the stator core 12, which basic insulation is located on the inside of the stator core 12.

When assembling the stator unit, an essential step is to first insert the coil separator cage 1 into the stator core 12 with the spaced-apart coils 16.1, 16.2; 16.2, 16.3. The coil separator cage 1 functions as a separation insert, which isolates the 12 adjacent coils 16.1, 16.2; 16.2, 16.3 in the circumferential direction of the cylindrical stator core from one another. A separating web 4 is arranged in the gap referred to as stator slot 18 between two adjacent coils 16.1, 16.2; 16.2; 16.3. The annular disc-shaped base part 2 covers a first end face 19 of the stator core 12, which corresponds to the end face facing the compressor unit, when used to drive a compressor of the compressor unit, whereby the outer frame 6 in the area adjacent to the end face 19 encloses the circumference of a base insulation not shown in FIG. 3, and thus rests directly on the end face 19 of the stator core 12.

Figure 3:
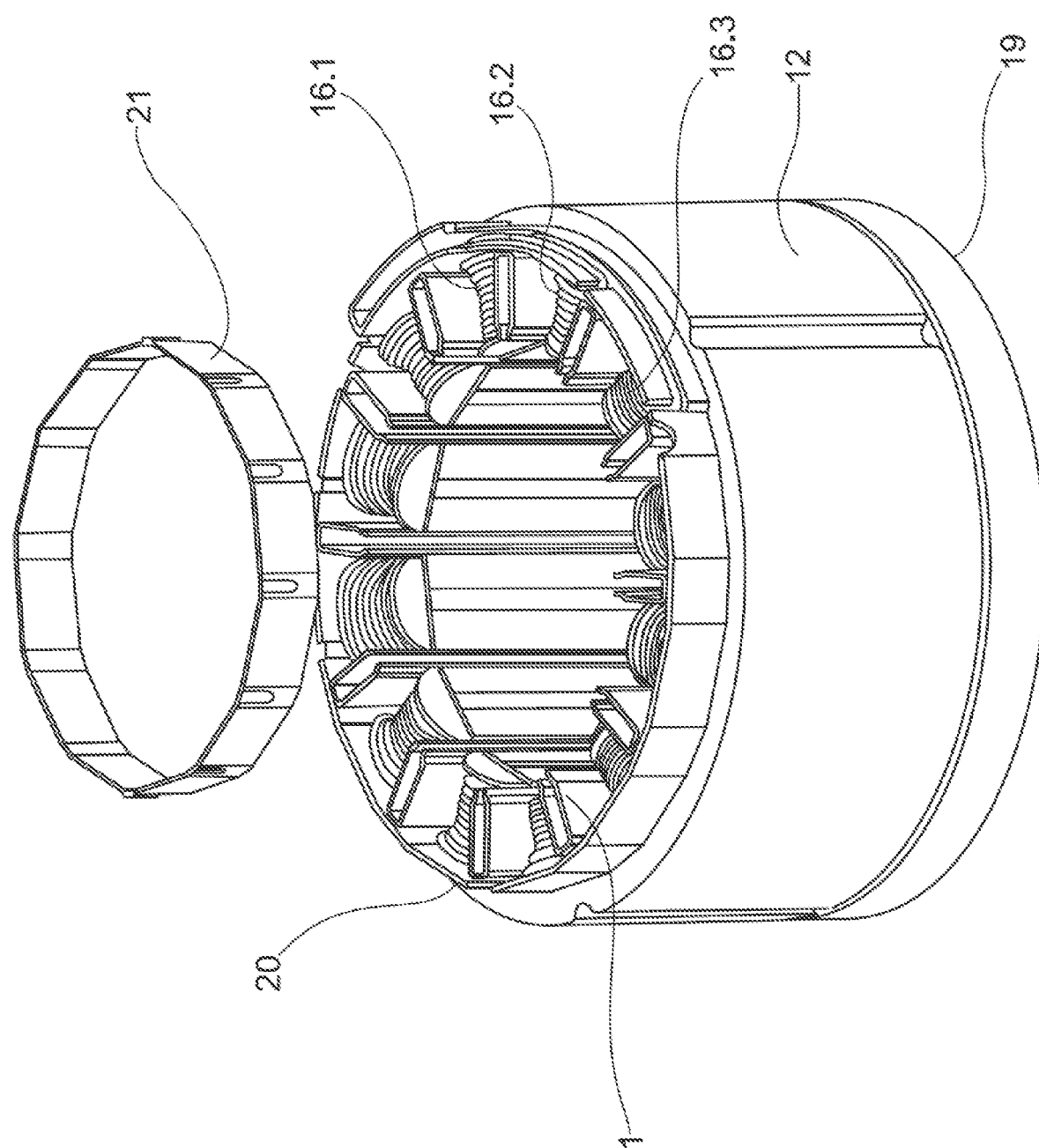
FIG. 3: insertion of a closing ring into the stator core with an inserted oil separator cage.
Figure 4:
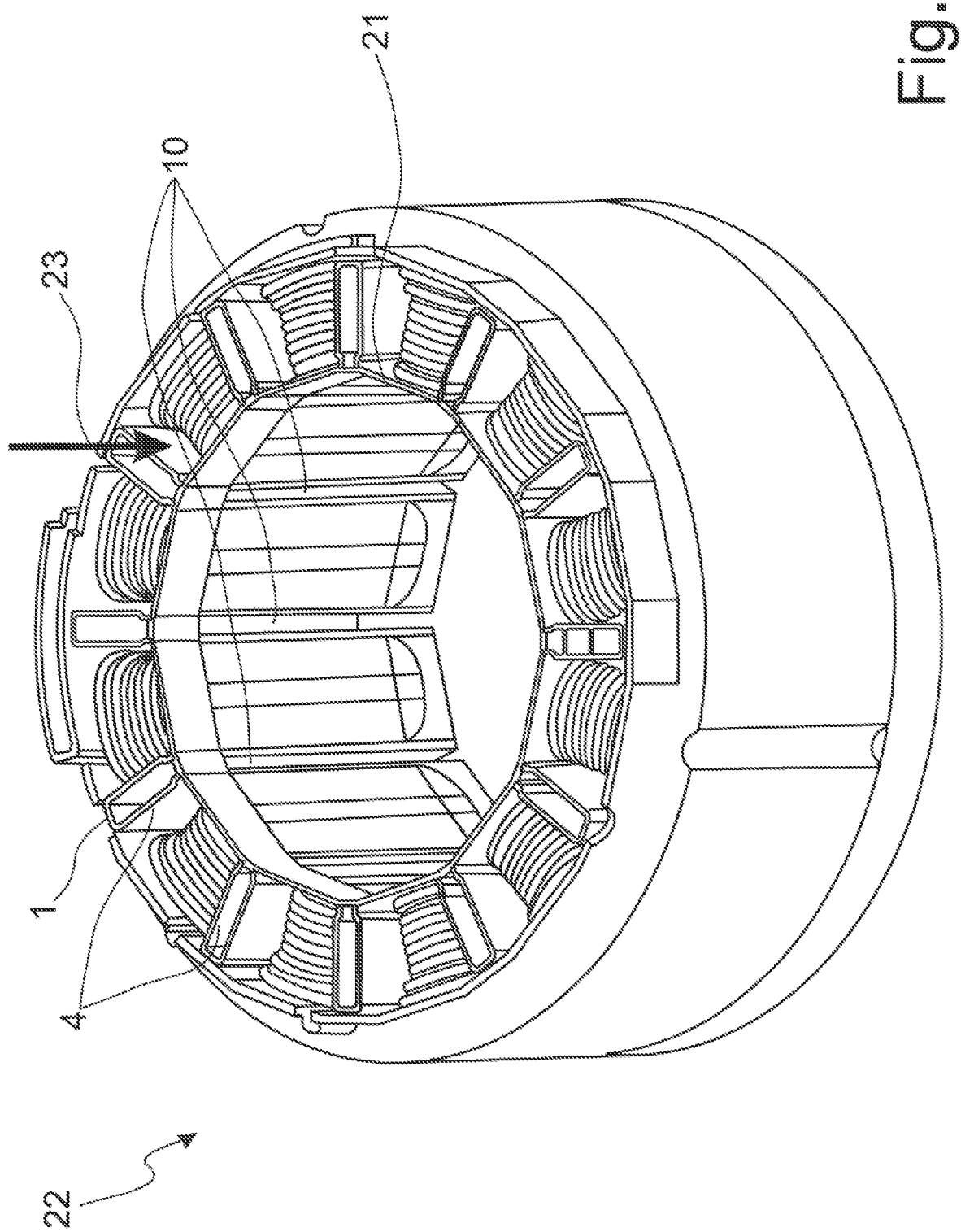
FIG. 4: the introduction of an insulating filler into the assembled stator unit.

FIG. 3 schematically shows assembly step $a_2$) following the insertion of the coil separator cage 1 into the stator core 12 with a view of the second end face 20 of the stator core 12, which is opposite the first end face 19 covered by the annular disc-shaped base part 2, and which corresponds to the end face facing the inverter, when used to drive a compressor. From the side opposite the first end face 19, an inner closing ring 21 is inserted in the axial direction and placed on the coil separator cage 1. FIG. 4 shows the assembled stator unit 22. The closing ring 21 is attached to the coil separator cage 1, such that it rests against the end sections of the inward-facing, exposed longitudinal sections 10 of the separating webs 4. The closing ring 21 affords the coil separator cage 1 more stability and connects key parts with one another. As shown in FIG. 4, the separating webs 4 of the coil separator cage 1 are connected to the closing ring 12, as are the coil webs 14 or plastic parts of the basic insulation adjacent to the coil webs. Following the above assembly steps, the areas between the surface of the coil separator cage 1 and the coil windings 16.1; 16.2; 16.3 are filled with insulating filler 23 in the form of a potting compound or similar material, as indicated schematically by an arrow in FIG. 4.

Figure 5:
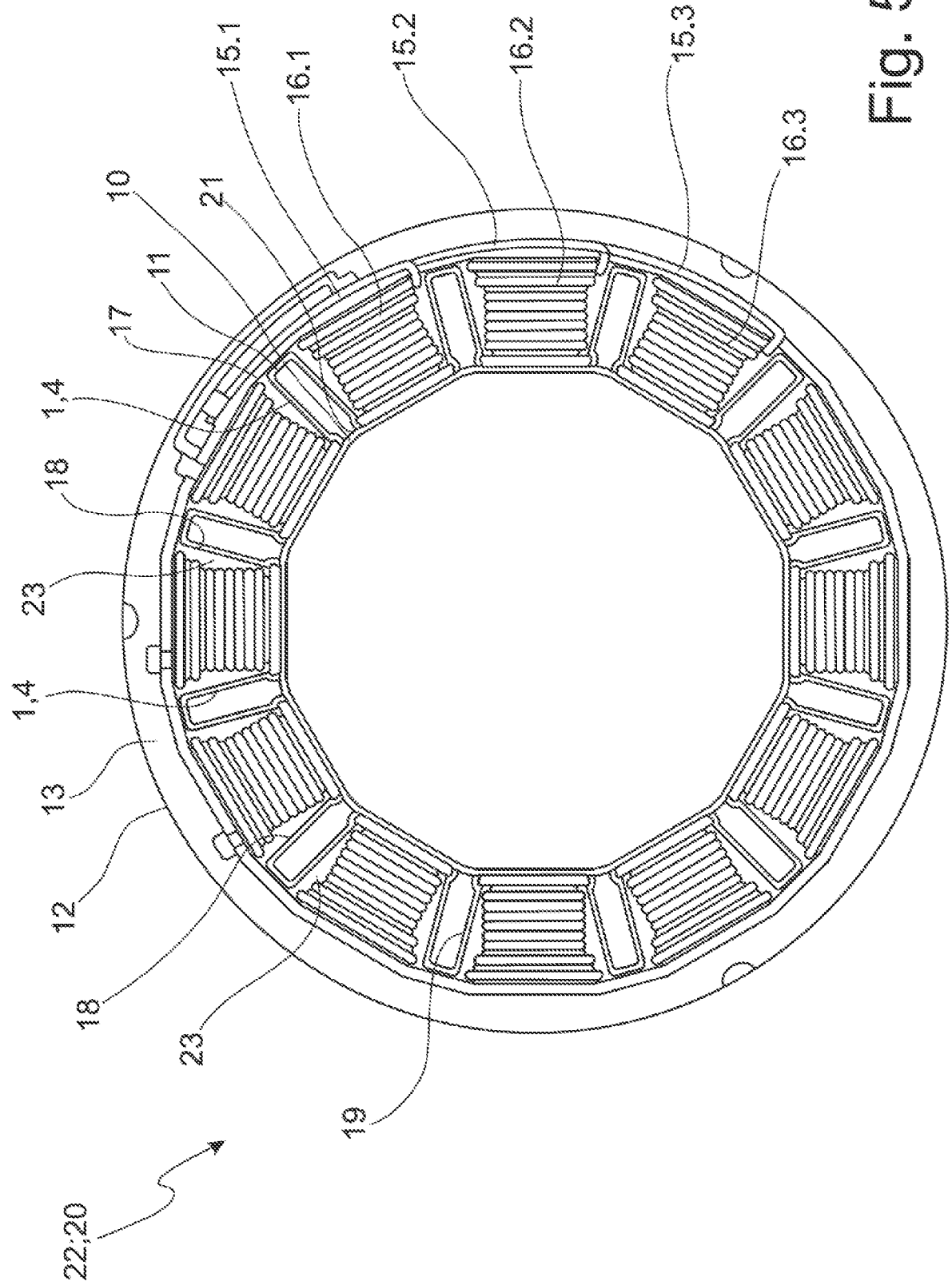
FIG. 5: a plan view of an assembled stator unit with a separator cage according to a first embodiment with a view of a second end face.

Finally, FIG. 5 is a plan view of the assembled stator unit 22 with a view of the second end face 20 with lead wires 15.1, 15.2, 15.3 of different phases, each of which is wound into different coils 16.1, 16.2, 16.3 arranged one after the other in the circumferential direction. The coil separator cage 1 is inserted in the stator core 12 such that a separating web 4 is always located in the stator slots 18 between the adjacent coils 16.1, 16.2; 16.2, 16.3. The cross sections of the separating webs 4 each have a rectangular U-shape in the embodiment shown, wherein the exposed side of the U-shape rests against the outer wall in proximity to the closing ring 21. A constriction is formed on the exposed side of the U-shape, whereby this exposed side corresponds to the exposed longitudinal area 10. In addition, the exposed side of the U-shape in the area of the closing ring 21 is covered by the latter. With the opposite side facing outwards, i.e., the U-base area of the cross-section, which corresponds in cross-section to the closed longitudinal area 11, the separating webs 4 rest against the inner wall of the stator core 12 in the area of the stator yoke 13, which is covered with base insulation 17 In addition, the areas between the surface of the coil separator cage 1 and the coil windings 16.1; 16.2; 16.3 are filled with the insulating filler 23 in the form of a potting compound.

Figure 6:
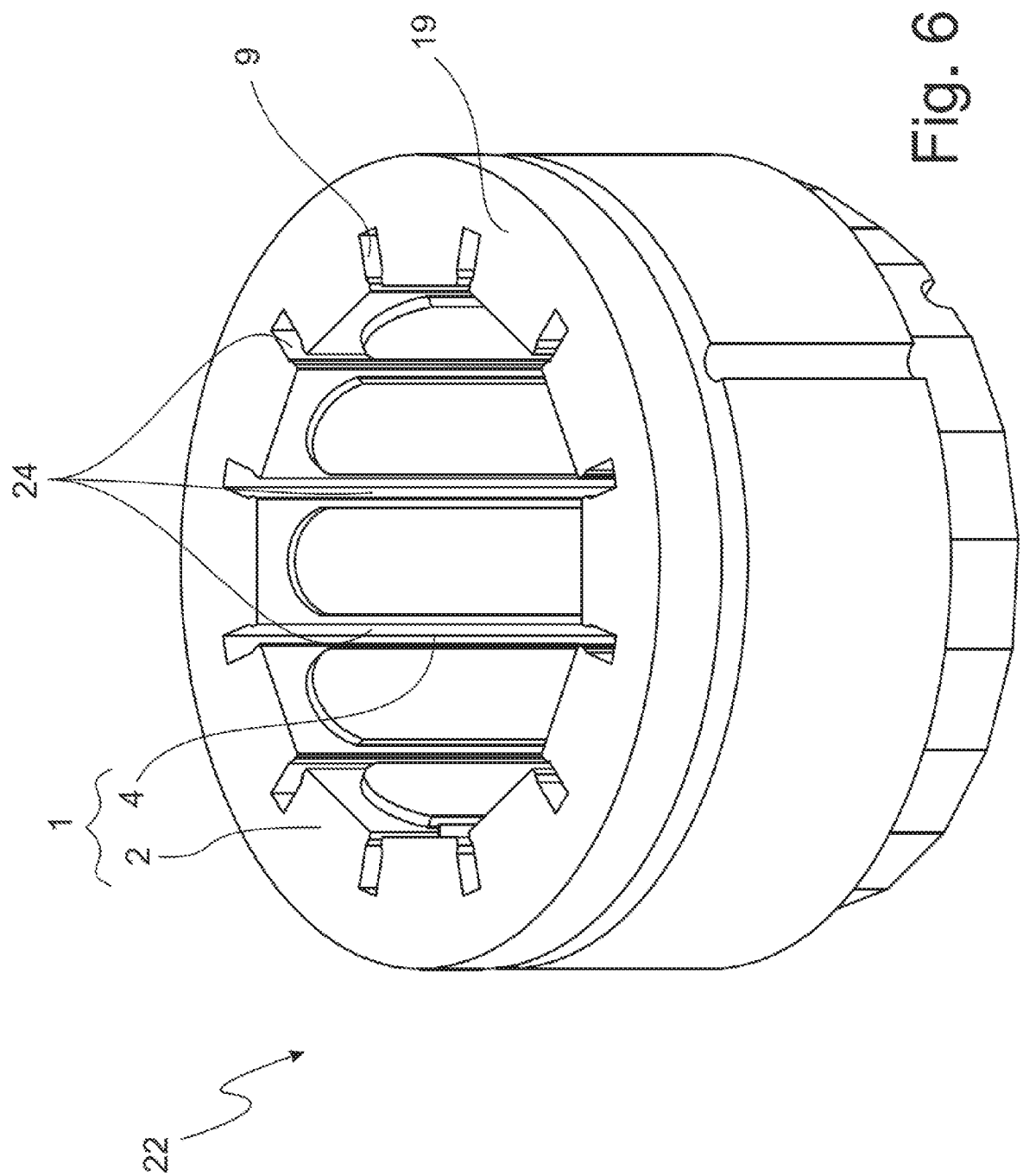
FIG. 6: a perspective view of the stator unit with a separator cage according to the first embodiment with a view of a first end face.

Finally, FIG. 6 is a perspective view of the said assembled stator unit 22 with a view of the first end face 19 with the annular disc-shaped base part 2 with the recesses 9, each of which, corresponding to the cross-section of the separating webs 4, has a substantially rectangular cross-section with a constriction on the exposed side of the recess 9. Together with the recesses 9, the separating webs 4 form elongated channels 24 running in the axial direction, which extend over the entire axial length of the stator unit 22.

Figure 7:
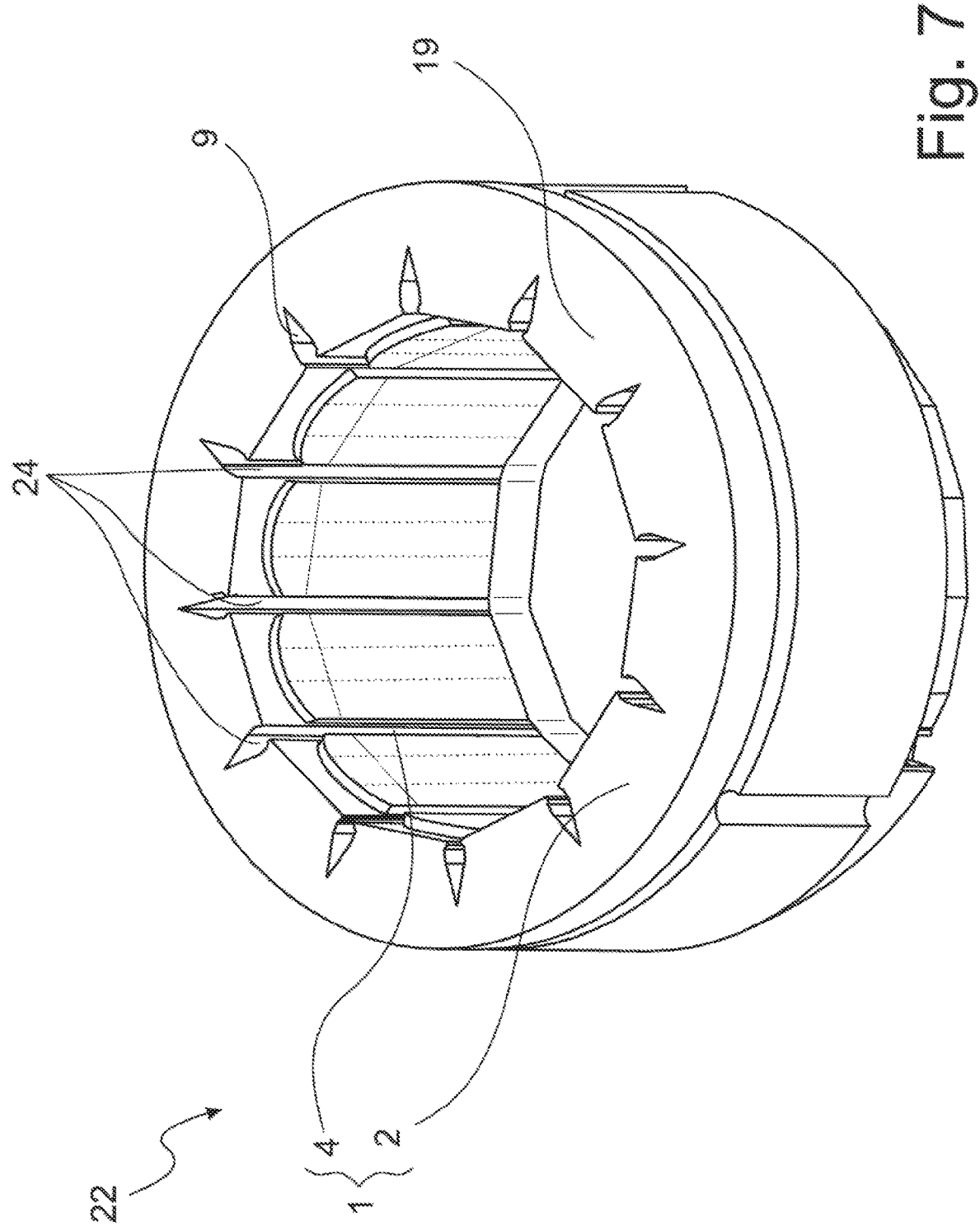
FIG. 7: a plan view of an assembled stator unit with a separator cage according to a second embodiment.
Figure 8:
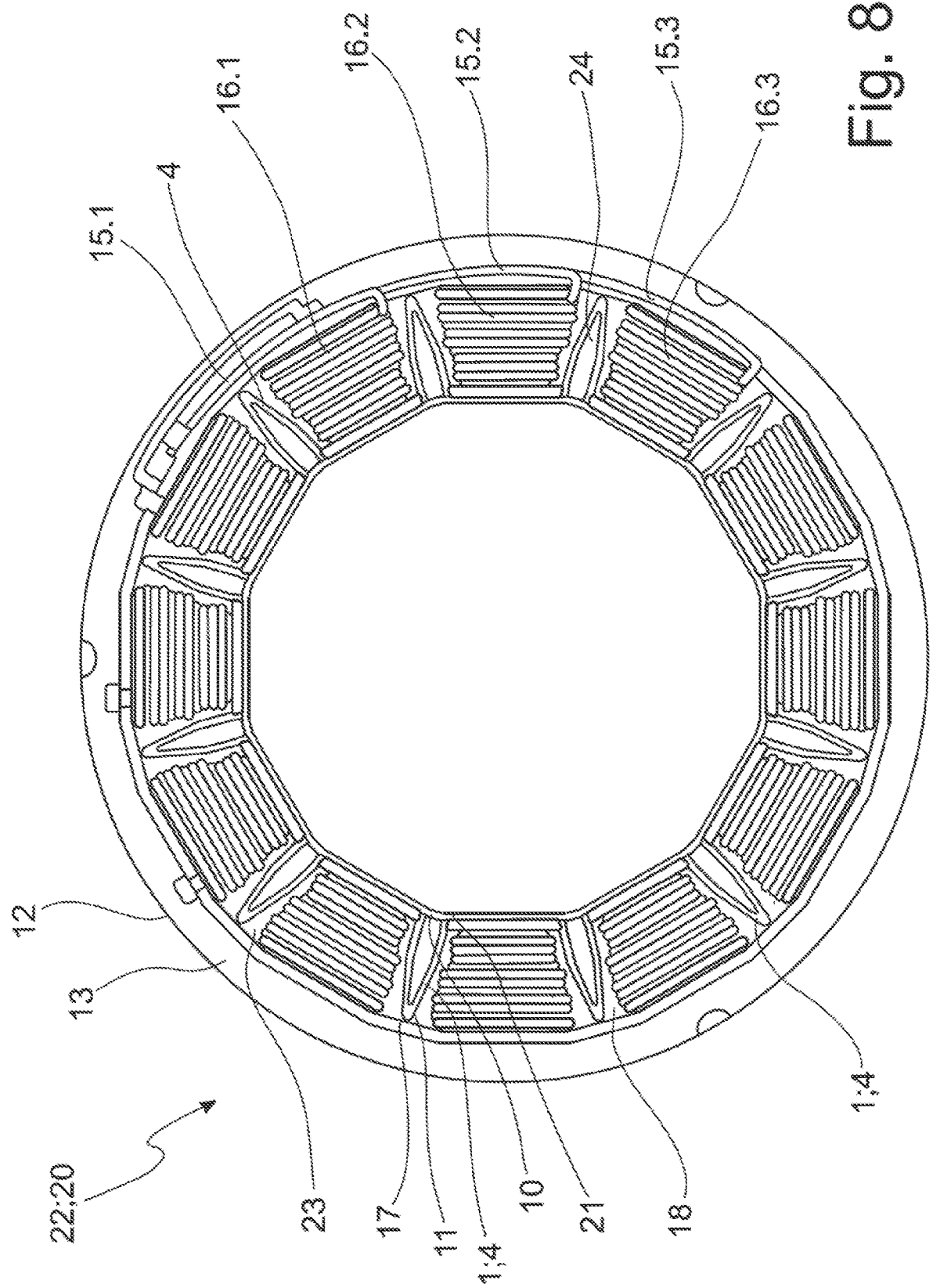
FIG. 8: a perspective view of the stator unit with a separator cage according to the second embodiment with a view of the first end face.

Finally, FIG. 7 shows a corresponding perspective view of an assembled stator unit 22 with a view of the first end face 19 with the annular disc-shaped base part 2, in which the recesses 9 have a V-shaped cross-section, with the V-limbs being convex, i.e. curved outward. Together with the recesses 9, the separating webs 4 form axially extending channels 24 with a corresponding cross-section, which channels extend from the first end face 19 to the second end face 20. FIG. 8 shows a plan view of the corresponding assembled stator unit 22 with a view of the second end face 20 with the lead wires 15.1, 15.2, 15.3 of different phases, each wound into different coils 16.1, 16.2, 16.3 arranged one after the other in the circumferential direction. The coil separator cage 1 is arranged, such that a separating web 4 engages in each stator slot 18, whereby one of the separating webs 4 is arranged between two adjacent coils. The separating webs 4 of the coil separator cage 1, which extend from the annular disc-shaped base part over the whole length of the stator unit 22, have the same substantially V-shaped cross-section with convexly bent V-limbs, as do the recesses 9 in the annular disc-shaped base part, as shown in FIG. 7. The exposed side of the V-shape is covered by the closing ring 21 in the area of the closing ring. With their opposite side facing outwards, the V-vertex, which corresponds in cross-section to the closed longitudinal area 11, the separating webs 4 abut against the inner wall of the stator core 12, which wall is covered with base insulation 17, in the area of the stator yoke 13. The areas between the outer surfaces of the separating webs 4 of the coil separator cage 1, the coil windings 16.1; 16.2; 16.3 and the closing ring 21 are filled with the insulating filler 23 in the form of casting compound, while the axial channels 24 are used for cooling and therefore remain free of the insulating filler 23.

Figure 9:
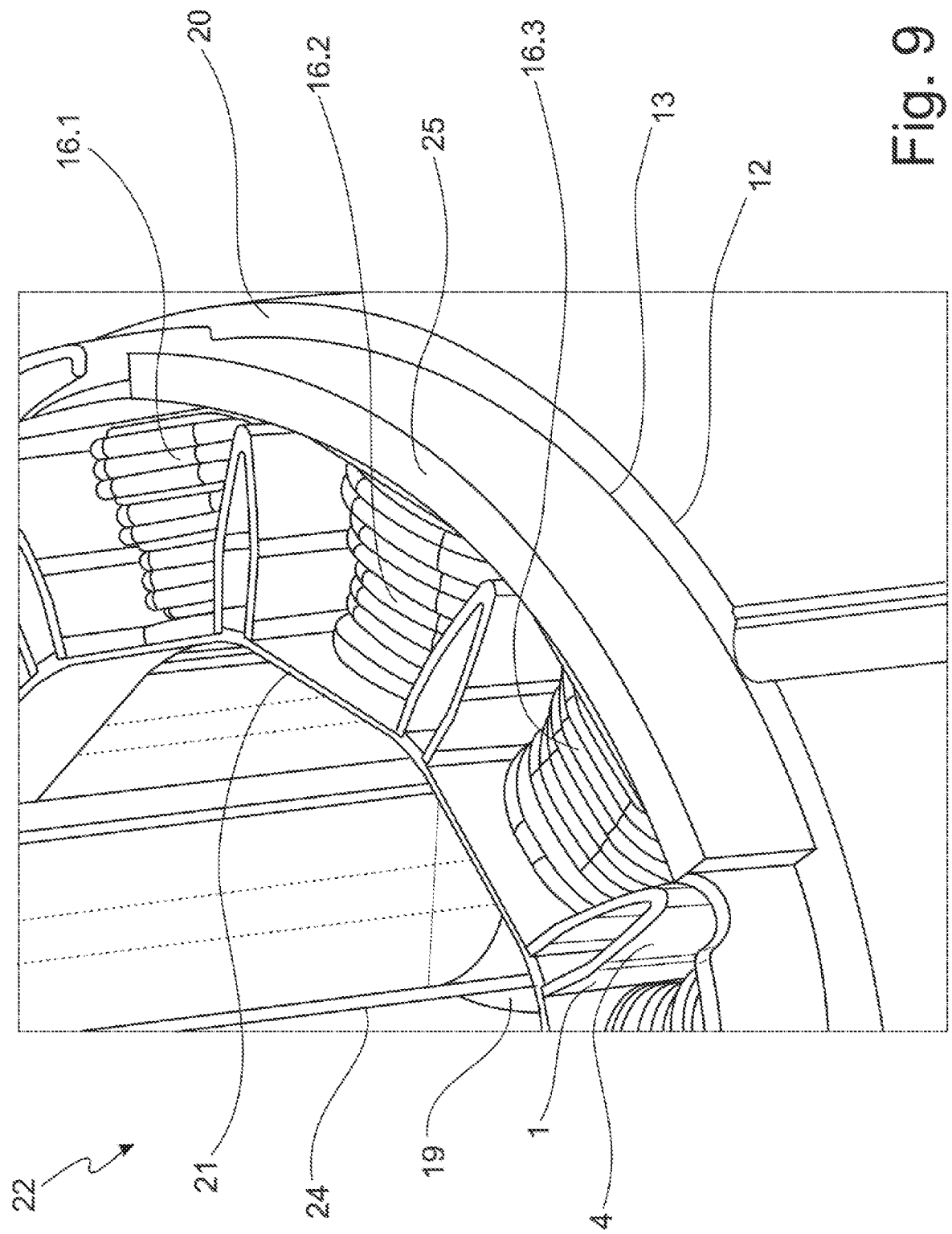
FIG. 9: a perspective detailed view of a part of the stator unit with a view of the second end face.

FIG. 9 shows a perspective detailed view of the stator unit 22 with a part of the second end face 20 and three adjacent separators 4 of the coil separator cage 1, the windings of the adjacent coils 16.1; 16.2; 16.3, and part of the end ring 21, as well as an axial channel 24 formed by a separator 4, which, starting from the first end face 19, extends in axial direction through the whole stator unit 22. The separating webs 4 are longer in the axial direction than are the coil webs 14 and the windings around them. Thus, the ends of the separating webs 4 are situated above the winding heads, as shown in FIG. 9. This also helps increase the gap and creepage distances. The adjacent lead wires of the different phases, which are guided individually above the hollow cylindrical part of the stator core 12, of the stator yoke 13, in the circumferential direction at the so-called star point of the windings, are covered with an additional arc-shaped insulation area 25, which adheres to the shape of the cylinder wall in the area of the lead wires and is applied in the form of a potting compound.

REFERENCE NUMERAL LIST

1 Coil separator cage
2 Annular disc-shaped base part
3 Ring axis
4 Separator
5 Outer edge
6 Outer frame
7 Inner rim
8 Inner frame
9 Recesses
10 Exposed longitudinal area
11 Closed longitudinal area
12 Stator core
13 Stator yoke
14 Coil webs
15.1 Lead wire
15.2 Lead wire
15.3 Lead wire
16.1 Coil
16.2 Coil
16.3 Coil
17 Base insulation
18 Stator slot
19 First end face
20 Second end face
21 Inner closing ring
22 Stator unit
23 Insulating filler
24 Axial channel
25 Insulation area

What is claimed is:

1. A stator unit of an electric motor for driving a hermetic compressor, comprising:
   a stator core with a substantially hollow-cylindrical stator yoke, an inside of the stator core has coil webs evenly distributed over a circumference of the stator core and the coil webs are directed radially inward in relation to a cross-section of the stator core, wherein stator slots are formed between adjacent ones of the coil webs in a circumferential direction, and lead wires are wound around the coil webs to form coils; and
   a coil separator cage, inserted into the stator core, the coil separator cage further comprising a substantially annular disc-shaped base part and elongated separating webs distributed over a circumference of the annular disc-shaped base part, and longitudinal axes of the elongated separating webs extending in an axial direction relative to the stator core, a cross-section of each of the elongated separating webs respectively corresponding to a shape of one of a plurality of recesses in the annular disc-shaped base part and which, together with a corresponding the one of the recesses, form axial channels over an entire length of the coil separator cage, wherein the annular disc-shaped base part is fastened to a first end face of the stator core and each of the elongated separating webs engages in each of the stator slots, such that one of the elongated separating webs is arranged between two adjacent ones of the coils, wherein a gap between each of the coil separator cage and windings of the coils is filled with an insulating filler material, whereas the axial channels remain free for cooling, wherein the stator unit further comprises an inner closing ring, attached to the coil separator cage in an area of a second end face of the stator core, which is situated opposite the first end face, such that end areas of the elongated separating webs opposite the annular disc-shaped base part abut with inward-directed sides against an outer wall of the inner closing ring and are distributed over a periphery thereof, whereby the gap between each of the coil separator cage, the coil windings and the inner closing ring is filled with the insulating filler material.

2. The stator unit according to claim 1, wherein the elongated separating webs abut with a respective outward directed side against an inner wall of the stator yoke or a base insulation of the inner wall.

3. The stator unit according to claim 1, wherein the insulating filler material is an adhesive or other binder.

4. The stator unit according to claim 1, wherein the insulating filler material is an adhesive or other binder based on epoxy resin.

5. The stator unit according to claim 1, wherein a cross-section of the elongated separating webs is U-shaped.

6. The stator unit according to claim 1, wherein a cross-section of the elongated separating webs is V-shaped.

7. A method for assembling a stator insulation system for a stator unit, the method comprising steps of:
   a1) inserting a coil separator cage in an axial direction into a stator core, the coil separator cage having a substantially annular disc-shaped base part and elongated separating webs distributed over a circumference of the annular disc-shaped base part and extending with longitudinal axes of the elongated separating webs in the axial direction relative to the stator core, a cross-section of each of the elongated separating webs corresponding to a shape of each of a plurality of recesses in the annular disc-shaped base part, and which, together with the corresponding recesses, form axial channels extending over an entire length of the coil separator cage, such that between two adjacent coils, one of the elongated separating webs is inserted in the axial direction and the annular disc-shaped base part is fastened to a first end face of the stator core, wherein the stator core has coil webs on an inside of a substantially hollow-cylindrically shaped stator yoke, the coil webs uniformly distributed over a circumference of the stator core and directed radially inward relative to a cross-section of the stator core, wherein stator slots are formed between adjacent ones of the coil webs in a circumferential direction and lead wires are wound around the coil webs to form coils, and b) filling a gap between each of the coil separator cage and the coils with an insulating filler whereas the axial channels remain free for cooling, wherein the method further comprises a step a2) following step a1) and preceding method step b), attaching an inner closing ring to the coil separator cage, such that end areas of the elongated separating webs, which are opposite the annular disc-shaped base part, abut with inward-directed sides against an outer wall of the inner closing ring, and are distributed over a circumference thereof, such that the elongated separating webs are supported from an inside by the inner closing ring, and in method step b), the gap between each of the coil separator cage, the coils and the inner closing ring is filled with the insulating filler.

8. The method according to claim 7, wherein the insulating filler is introduced into the gap as a potting compound.

* * * * *